(12) United States Patent
St. Hilaire

(10) Patent No.: US 11,789,273 B2
(45) Date of Patent: Oct. 17, 2023

(54) VIRTUAL REALITY, AUGMENTED REALITY, AND MIXED REALITY SYSTEMS INCLUDING THICK MEDIA AND RELATED METHODS

(71) Applicant: Magic Leap, Inc., Plantation, FL (US)

(72) Inventor: Pierre St. Hilaire, Belmont, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/650,823

(22) Filed: Feb. 11, 2022

(65) Prior Publication Data
US 2022/0163807 A1 May 26, 2022

Related U.S. Application Data

(63) Continuation of application No. 16/678,894, filed on Nov. 8, 2019, now Pat. No. 11,281,006, which is a
(Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/1819* (2013.01); *G02B 5/32* (2013.01);
(Continued)

(58) Field of Classification Search
CPC .............. G02B 5/18; G02B 2005/1804; G02B 5/1814; G02B 5/1819; G02B 5/1823;
(Continued)

(56) References Cited

U.S. PATENT DOCUMENTS 7,502,168 B2 * 3/2009 Akutsu .............. G02B 27/4272
359/15
9,465,215 B2 10/2016 Richards et al.
(Continued)

FOREIGN PATENT DOCUMENTS

CN 104040410 9/2014
CN 104737061 6/2015
(Continued)

OTHER PUBLICATIONS

Foreign NOA for KR Patent Appln. No. 10-2021-7036013 dated Jan. 2, 2023.
(Continued)

*Primary Examiner* — Arnel C Lavarias
(74) *Attorney, Agent, or Firm* — Vista IP Law Group, LLP

(57) ABSTRACT

A head worn imaging system includes a light source configured to generate a light beam. The system also includes a light guiding optical element having a thickness between 0.1 and 1.5 mm and configured to propagate at least a portion of the light beam by total internal reflection. The system further includes an entry portion and an exit portion of the light guiding optical element configured to selectively allow light addressing the exit portion to exit the light guiding optical element based on the angle of incidence of the light, the radius of curvature of the light and/or the wavelength of the light.

12 Claims, 7 Drawing Sheets

Related U.S. Application Data continuation of application No. 15/698,482, filed on Sep. 7, 2017, now Pat. No. 10,539,799.

(60) Provisional application No. 62/384,552, filed on Sep. 7, 2016.

(51) Int. Cl.

| | |
|---|---|
| G03H 1/02 | (2006.01) |
| G02B 5/32 | (2006.01) |
| G02B 27/00 | (2006.01) |
| G03H 1/28 | (2006.01) |
| G02B 5/18 | (2006.01) |
| G03H 1/22 | (2006.01) |

(52) U.S. Cl.
CPC ......... *G02B 6/0016* (2013.01); *G02B 6/0038* (2013.01); *G02B 27/0081* (2013.01); *G02B 27/0179* (2013.01); *G03H 1/0248* (2013.01); *G03H 1/28* (2013.01); *G02B 2027/0125* (2013.01); *G02B 2027/0174* (2013.01); *G02B 2027/0178* (2013.01); *G02B 2027/0185* (2013.01); *G03H 2001/2226* (2013.01); *G03H 2210/33* (2013.01)

(58) Field of Classification Search
CPC ................ G02B 5/1828; G02B 5/1842; G02B 5/1861; G02B 5/1866; G02B 5/32; G02B 27/01; G02B 27/0101; G02B 27/0103; G02B 2027/0105; G02B 2027/0107; G02B 2027/0112; G02B 27/017; G02B 27/0172; G02B 2027/0174; G02B 2027/0192; G02B 2027/0194; G02B 2027/0196; G02B 27/10; G02B 27/1006; G02B 27/1086; G02B 27/42; G02B 27/4205; G02B 27/4272; G02B 27/44
USPC ....... 359/567, 558, 566, 569, 571, 572, 573, 359/574, 575, 576, 618, 629, 630, 633, 359/634, 1, 15, 19, 32, 33, 35
See application file for complete search history.

(56) References Cited

U.S. PATENT DOCUMENTS

| | | | |
|---|---|---|---|
| 10,025,009 B2 | 7/2018 | Yamada et al. | |
| 10,133,075 B2 | 11/2018 | Bailey et al. | |
| 10,539,799 B2* | 1/2020 | St. Hilaire | G02B 27/0172 |
| 11,281,006 B2* | 3/2022 | St. Hilaire | G02B 6/0038 |
| 2006/0132914 A1 | 6/2006 | Weiss | |
| 2012/0300311 A1 | 11/2012 | Simmonds et al. | |
| 2015/0248169 A1 | 9/2015 | Abovitz et al. | |
| 2015/0346490 A1 | 12/2015 | Tekolste | |
| 2016/0116739 A1 | 4/2016 | TeKolste et al. | |
| 2020/0142198 A1 | 5/2020 | St. Hilaire | |

FOREIGN PATENT DOCUMENTS

| | | |
|---|---|---|
| JP | 2009-516862 | 4/2009 |
| JP | 2012-42654 | 3/2012 |
| JP | 2015-105990 | 6/2015 |

OTHER PUBLICATIONS

Foreign FOA for KR Patent Appln. No. 10-2021-7036013 dated Aug. 25, 2022.
Foreign Response for EP Patent Appln. No. 17849554.5 dated Apr. 19, 2022.
Foreign Response for KR Patent Appln. No. 10-2021-7036013 dated Apr. 20, 2022.
Foreign NOA for JP Patent Appln. No. 2020-147458 dated May 10, 2022.
Foreign OA for KR Patent Appln. No. 10-2021-7036013 dated Feb. 21, 2022 (with English translation).
Extended European Search Report for European Appln. No. 17849554.5 dated Aug. 9, 2019 (7 pages).
Response to Communication pursuant to Rules 70(2) and 70a(2) EPC for European Appln. No. 17849554.5 dated Mar. 23, 2020 (54 pages).
Foreign Office Action for CN Patent Appln. No. 201780054263.2 dated Mar. 16, 2020.
Foreign OA Response for CN Patent Appln. No. 201780054263.2 dated Jul. 20, 2020.
Foreign OA for KR Patent Appln. No. 10-2019-7009888 dated Oct. 19, 2020.
Non-Final Office Action for U.S. Appl. No. 15/698,482 dated Apr. 24, 2019.
Amendment Response to NFOA for U.S. Appl. No. 15/698,482 dated Aug. 26, 2019.
Notice of Allowance for U.S. Appl. No. 15/698,482 dated Oct. 22, 2019.
Foreign Office Action for JP Patent Appln. No. 2019-512751 dated Oct. 23, 2020.
Foreign OA for CN Patent Application No. 201780054263.2 dated Nov. 6, 2020.
Foreign Response for KR Patent Appln. No. 10-2019-7009888 dated Dec. 14, 2020.
Foreign Response for CN Patent Appln. No. 201780054263.2 dated Jan. 6, 2021.
Foreign Response for JP Patent Appln. No. 2019-512751 dated Jan. 19, 2021.
Foreign Exam Report for EP Patent Appln. No. 17849554.5 dated Dec. 23, 2020.
Foreign OA for KR Patent Appln. No. 10-2019-7009888 dated Feb. 26, 2021.
Foreign OA for JP Patent Appln. No. 2019-512751 dated Mar. 4, 2021.
Foreign Response for KR Patent Appln. No. 10-2019-7009888 dated Apr. 8, 2021.
Foreign Response for EP Patent Appln. No. 17849554.5 dated May 3, 2021.
Foreign NOA for CN Patent Appln. No. 201780054263.2 dated Apr. 22, 2021.
Foreign Response for JP Patent Appln. No. 2019-512751 dated Jun. 3, 2021..
Foreign FOA for KR Patent Appln. No. 9-5-2021-048526914 dated Jun. 18, 2021.
Foreign NOA for JP Patent Appln. No. 2019-512751 dated Aug. 3, 2021.
Foreign NOA for KR Patent Appln. No. 10-2019-7009888 dated Aug. 5, 2021.
Notice of Allowance for U.S. Appl. No. 16/678,894 dated Nov. 15, 2021.
Foreign OA for JP Patent Appln. No. 2020-147458 dated Nov. 9, 2021 with English translation.
Foreign Exam Report for EP Patent Appln. No. 17849554.5 dated Dec. 8, 2021.
Foreign Response for JP Patent Appln. No. 2020-147458 dated Feb. 8, 2022.
Foreign OA for JP Patent Appln. No. 2022-93522 dated Jul. 15, 2022.
Foreign Response for JP Patent Appln. No. 2022-93522 dated Oct. 14, 2022.
Foreign NOA for JP Patent Appln. No. 2022-93522 dated Oct. 31, 2022.
Foreign OA for CN Patent Application No. 202110742269.7 dated Nov. 10, 2022.
Foreign Response for KR Patent Appln. No. 10-2021-7036013 dated Nov. 25, 2022.
Foreign Response for CN Patent Appln. No. 202110742269.7 dated Mar. 16, 2023.
Foreign Intent to Grant for EP Patent Appln. No. 17849554.5 dated May 9, 2023.

(56) References Cited

OTHER PUBLICATIONS

Foreign Response for CN Patent Appln. No. 202110742269.7 dated Jul. 3, 2023.
Foreign NOA for CN Patent Appln. No. 202110742269.7 dated Jul. 19, 2023.

* cited by examiner

VIRTUAL REALITY, AUGMENTED REALITY, AND MIXED REALITY SYSTEMS INCLUDING THICK MEDIA AND RELATED METHODS

CROSS-REFERENCE TO RELATED APPLICATION(S)

The present application is a continuation of pending U.S. patent application Ser. No. 16/678,894, filed on Nov. 8, 2019 and entitled "VIRTUAL REALITY, AUGMENTED REALITY, AND MIXED REALITY SYSTEMS INCLUDING THICK MEDIA AND RELATED METHODS," which is a continuation of U.S. patent application Ser. No. 15/698,482, filed on Sep. 7, 2017 and entitled "VIRTUAL REALITY, AUGMENTED REALITY, AND MIXED REALITY SYSTEMS INCLUDING THICK MEDIA AND RELATED METHODS," which claims priority to U.S. Provisional Application Ser. No. 62/384,552, filed on Sep. 7, 2016 and entitled "MIXED REALITY SYSTEMS INCLUDING THICK MEDIA AND RELATED METHODS." This application is related to U.S. Utility patent application Ser. No. 14/331,218 filed on Jul. 14, 2014 and entitled "PLANAR WAVEGUIDE APPARATUS WITH DIFFRACTION ELEMENT(S) AND SYSTEM EMPLOYING SAME," U.S. Utility patent application Ser. No. 14/555,585 filed on Nov. 27, 2014 and entitled "VIRTUAL AND AUGMENTED REALITY SYSTEMS AND METHODS," filed on May 29, 2015 and entitled "METHODS AND SYSTEMS FOR VIRTUAL AND AUGMENTED REALITY," U.S. Utility patent application Ser. No. 14/726,429 filed on May 29, 2015 and entitled "METHODS AND SYSTEMS FOR CREATING FOCAL PLANES IN VIRTUAL AND AUGMENTED REALITY," U.S. Utility patent application Ser. No. 14/726,396 filed on May 29, 2015 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY," and U.S. Prov. Patent Application Ser. No. 62/156,809 filed on May 4, 2015 and entitled "SEPARATED PUPIL OPTICAL SYSTEMS FOR VIRTUAL AND AUGMENTED REALITY AND METHODS FOR DISPLAYING IMAGES USING SAME." The contents of the aforementioned patent applications are hereby expressly and fully incorporated by reference in their entirety, as though set forth in full.

BACKGROUND

Modern computing and display technologies have facilitated the development of systems for so called "mixed reality" ("MR"), "virtual reality" ("VR"), and "augmented reality" ("AR") experiences. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time. The human visual perception system is very complex, and producing a VR/AR/MR technology that facilitates a comfortable, natural-feeling, rich presentation of virtual image elements amongst other virtual or real-world imagery elements is challenging. The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to VR, AR, and MR systems. Accordingly, most conventional VR/AR/MR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

VR/AR/MR systems must also be capable of displaying virtual digital content at various perceived positions and distances relative to the user. The design of VR/AR/MR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project light at the eyes of a user using a plurality of light guiding optical elements such that the light and images rendered by the light appear to originate from multiple depth planes. The light guiding optical elements are designed to in-couple virtual light corresponding to digital or virtual objects and propagate it by total internal reflection ("TIR"), then to out-couple the virtual light to display the digital or virtual objects to the user's eyes. In AR/MR systems, the light guiding optical elements are also designed be transparent to light from (e.g., reflecting off of) actual real-world objects. Therefore, portions of the light guiding optical elements are designed to reflect virtual light for propagation via TIR while being transparent to real-world light from real-world objects in AR/MR systems.

To implement multiple light guiding optical element systems, light from one or more sources must be controllably distributed to each of the light guiding optical element systems. One approach is to use a large number of optical elements (e.g., light sources, prisms, gratings, filters, scan-optics, beam splitters, mirrors, half-mirrors, shutters, eye pieces, etc.) to project images at a sufficiently large number (e.g., six) of depth planes. The problem with this approach is that using a large number of components in this manner necessarily requires a larger form factor than is desirable, and limits the degree to which the system size can be reduced. The large number of optical elements in these systems also results in a longer optical path, over which the light and the information contained therein will be degraded. These design issues result in cumbersome systems which are also power intensive. The systems and methods described herein are configured to address these challenges.

SUMMARY

Embodiments of the invention provide an improved system by using a single thick (e.g., between about 0.1 to about 1.5 millimeter or "mm" thick) light guiding optical element (e.g., waveguide), which is configured to in-couple and out-couple light having narrow ranges of light curvatures, directions and/or wavelengths, to enable selectivity in angle of incidence, radius of curvature and/or wavelength. The waveguide allows multiplexing of multiple focal planes and/or wavelengths due to the large dynamic range of material. Only a portion of the light rays propagating along the waveguide are out-coupled because the thickness of the material from which the light guiding optical element is made facilitates angular or/and wavelength selectivity. As such, the light beams corresponding to a narrow angle and field curvature range and/or a narrow wavelength range will out-couple from the waveguide. The waveguide facilitates formation of in-coupling and out-coupling gratings that conserve both angle and wavefront curvature which allows for the precise control of individual ray location and direction for in-coupling and out-coupling. As such, multiple viewing planes can be multiplexed using a single thick light guiding optical element having a plurality of out-coupling gratings in a single polymer layer.

In one embodiment, a head worn imaging system includes a light source configured to generate a light beam. The system also includes a light guiding optical element having a thickness of between 0.1 and 1.5 mm. The light guiding optical element includes an entry portion and an exit portion. The light guiding optical element is configured to propagate at least a portion of the light beam by total internal reflection. The exit portion of the light guiding optical element is configured to selectively allow light addressing the exit portion to exit the light guiding optical element based on an angle of incidence of the light.

In another embodiment, a head worn imaging system includes a light source configured to generate a light beam. The system also includes a light guiding optical element having a thickness of between 0.1 and 1.5 mm. The light guiding optical element includes an entry portion and an exit portion. The light guiding optical element is configured to propagate at least a portion of the light beam by total internal reflection. The exit portion of the light guiding optical element is configured to selectively allow light addressing the exit portion to exit the light guiding optical element based on a wavelength of the light.

In still another embodiment, a head worn imaging system includes a light source configured to generate a light beam. The system also includes a light guiding optical element having a thickness of between 0.1 and 1.5 mm. The light guiding optical element includes an entry portion and an exit portion. The light guiding optical element is configured to propagate at least a portion of the light beam by total internal reflection. The exit portion of the light guiding optical element is configured to selectively allow light addressing the exit portion to exit the light guiding optical element based on a radius of the curvature of the light.

In one or more embodiments, the light guiding optical element allows multiplexing of light having a plurality of focal planes through the light guiding optical element. The light guiding optical element may allow multiplexing of light having a plurality of wavelengths through the light guiding optical element. The light guiding optical element may allow multiplexing of light having a plurality of radii of curvature through the light guiding optical element. The exit portion may include an out-coupling grating corresponding to a particular depth plane.

In one or more embodiments, the system also includes a variable focus element configured to adjust curvature of the light beam by adjusting at least one of focus before the light beam enters the light guiding optical element through the entry portion. A portion of light beam may be selected to exit the light guiding optical element based at least on a thickness of the light guiding optical element or an in-coupling grating.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
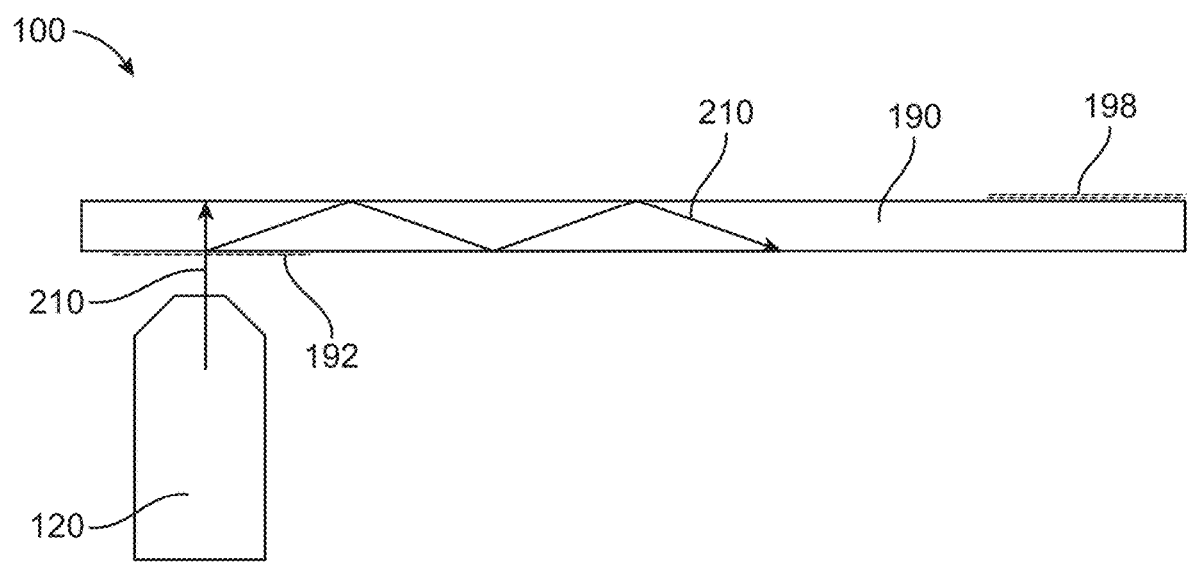
FIG. 1 is a detailed schematic of the optical system according to one embodiment.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems described herein may be implemented independently of VR/AR/MR systems, but many embodiments below are described in relation to VR/AR/MR systems for illustrative purposes only.

Summary of Problem and Solution

One type of optical system for generating images at various depths includes numerous optical components (e.g., light sources, prisms, gratings, filters, scan-optics, beam splitters, mirrors, half-mirrors, shutters, eye pieces, etc.) that increase in number, thereby increasing the complexity, size and cost of VR/AR/MR systems, as the quality of the 3D experience/scenario (e.g., the number of imaging planes) and the quality of images (e.g., the number of image colors) increases. The increasing size of optical systems with increasing 3D scenario/image quality imposes a limit on the size of VR/AR/MR systems resulting in cumbersome systems with reduced optical efficiency.

To implement a multiple light guiding optical elements head worn imagining system, light from one or more sources must be controllably distributed. Legacy solutions have involved using systems that utilize various light distribution systems, including various system components and designs, to reduce the size of optical systems while selectively distributing light from one or more light sources to a plurality of light guiding optical elements (e.g., planar waveguides) needed to render high quality VR/AR/MR scenarios. The problem with using these multiple light guiding optical elements type of systems is that the thin diffractive elements have little spectral and angular selectivity in the diffraction of rays propagating down the waveguide. This limits the capability of a single waveguide to provide multiple view planes and/or primary colors.

As such, in legacy solutions multiple waveguides are necessary to provide multiple view planes and primary colors. Legacy systems create multiple depth planes by using a stacked light guiding optical element ("LOE") assembly, with each LOE configured to display images that appear to originate from a particular depth plane. It should be noted that the stack may include any number of LOEs. However, at least N stacked LOEs are required to generate N depth planes. Further, N, 2N or 3N stacked LOEs may be used to generate RGB colored images at N depth planes. However, using multiple waveguides introduces many issues such as requirements for multi-plane switching elements, difficulty in aligning layers, thickness of resulting eyepieces, and scattering effects from multiple surface reflections.

The following disclosure describes various embodiments of systems and methods for creating 3D perception using a single thick light guiding optical element that address the problem, by providing optical systems with fewer components and increased efficiency. In particular, the systems described herein utilize a single thick light guiding optical element to reduce the number of optical system components while selectively distributing light from one or more light sources based on the angle of incidence, radius of curvature and wavelength of the light to the light guiding optical element required to render high quality VR/AR/MR scenarios.

Illustrative Optical Systems

Before describing the details of embodiments of the light distribution systems, this disclosure will now provide a brief description of illustrative optical systems. While the embodiments can be used with any optical system, specific systems (e.g., VR/AR/MR systems) are described to illustrate the technologies underlying the embodiments.

In order to present 3D virtual content to the user, the VR/AR/MR systems project images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
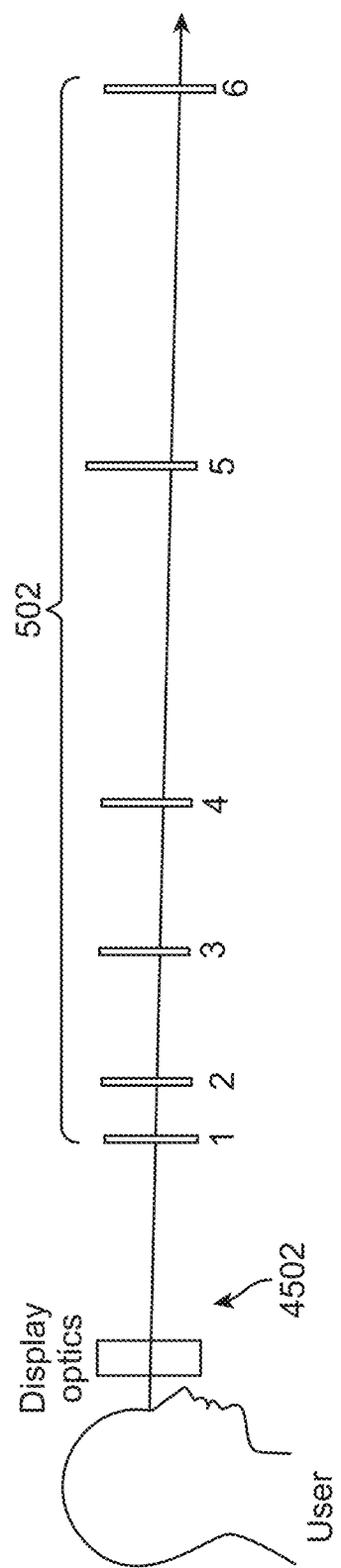
FIG. 5 is a diagram depicting the focal planes of an optical system according to one embodiment.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems typically display frames at fixed depth planes 502 (e.g., the six depth planes 502 shown in FIG. 5). Although VR/AR/MR systems can include any number of depth planes 502, one exemplary multiple-plane focus system has six fixed depth planes 502 in the Z direction. In generating virtual content one or more of the six depth planes 502, 3D perception is created such that the user perceives one or more virtual objects at varying distances from the user's eye. Given that the human eye is more sensitive to objects that are closer in distance than objects that appear to be far away, more depth planes 502 are generated closer to the eye, as shown in FIG. 5. In other embodiments, the depth planes 502 may be placed at equal distances away from each other.

Depth plane positions 502 are typically measured in diopters, which is a unit of optical power equal to the inverse of the focal length measured in meters. For example, in one embodiment, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 502 at other distances/diopters. Thus, in generating virtual content at strategically placed depth planes 502, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In one embodiment, the VR/AR/MR system may work as a multiple-plane focus system. In other words, a single LOE 190 is illuminated, such that images appearing to originate from six fixed depth planes are generated simultaneously with the light source rapidly conveying image information to LOE. For example, a portion of the desired image, comprising an image of the sky at optical infinity may be injected at time 1 and the LOE 190 retaining collimation of light (e.g., depth plane 6 from FIG. 5) may be utilized. Then an image of a closer tree branch may be injected at time 2 and an LOE 190 configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

Some VR/AR/MR systems project images (i.e., by diverging or converging light beams) that appear to originate from various locations along the Z axis (i.e., depth planes) to generate images for a 3D experience. As used in this application, light "beams" or "rays" include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

One possible approach to implementing a VR/AR/MR system uses a single thick volume phase hologram, or light guiding optical element ("LOE") that is embedded with gratings corresponding to different depth plane information to generate images that appear to originate from respective depth planes. In other words, a diffraction pattern, or diffractive optical element ("DOE") may be embedded within or imprinted upon an LOE such that as light is substantially totally internally reflected along the LOE, it intersects the diffraction pattern at multiple locations and exits toward the user's eye. The DOEs are configured so that light exiting therethrough from a LOE are verged so that they appear to originate from a particular depth plane.

The thick LOE also allows the DOE (e.g., in-coupling and out-coupling gratings) to preserve the curvature of the wavefronts throughout the wavelength. This allows light to be focused before entering the LOE, thereby minimizing the thickness of the displays by moving the variable focus element ("VFE") away from the "lens" of the glasses. As such, controlling the direction and curvature of the light coupled into the eyepiece will directly correspond to the direction and curvature of the individual rays that will come out of the "lens" of the glasses.

The eyepiece (i.e., LOE) applies principles of edge-lit holography by using an edge-introduced reference beam for recording and similar illumination beam for display to allow a simplified display configuration. This type of display integrates the hologram (i.e., LOE), its supporting display structure, and the illumination source into a compact device.

Traditionally, reflection and transmission holograms are considered distinct types with each having its own unique optical properties. A key difference between the reflection hologram and transmission hologram is the geometric orientation of their fringes. This results directly from the different directions of their respective reference beams as either running perpendicular to the face of the hologram for transmission types and parallel to the face of the hologram for reflection types.

The system also takes advantage of Kogelnik's Coupled wave theory to utilize the diffraction in volume gratings and holograms. Kogelnik's theory assumes that only two plane waves propagate inside and outside a finite thickness grating. Kogelnik's Coupled wave theory is a successful approach to understanding diffraction in sinusoidal volume gratings and in providing analytic formulae for the calculation of diffractive efficiency. The first wave is assumed to be the illuminating "reference" wave and the second "signal" wave is the hologram's response. The two-wave assumption is based on the assumption that coupling to higher order modes will be negligible.

FIG. 1 depicts a basic optical system 100 for projecting images at a single depth plane. The system 100 includes a light source 120 and an LOE 190 having an in-coupling grating 192 ("ICG") and an out-coupling grating 198 ("OCG"). The light source 120 can be any suitable imaging light source, including, but not limited to DLP, LCOS, LCD and Fiber Scanned Display. Such light sources can be used with any of the systems 100 described herein. The ICG 192 and OCG 198 may be diffractive optical elements of any type, including volumetric or surface relief. The ICG 192 and OCG 198 can be a reflection-mode aluminized portion of the LOE 190. Alternatively, the ICG 192 and OCG 198 can be a transmissive diffractive portion of the LOE 190. When the system 100 is in use, a virtual light beam 210 from the light source 120, enters the LOE 190 via the ICG 192, propagates along the LOE 190 by substantially total internal reflection ("TIR") and exits the LOE 190 via the OCG 198 for display to an eye of a user. The light beam 210 is virtual because it encodes an image or a portion thereof as directed by the system 100. It is understood that although only one beam is illustrated in FIG. 1, a multitude of beams, which encode an image, may enter LOE 190 from a wide range of angles through the same ICG 192 and exit through one or more OCG 198. A light beam "entering" or being "admitted" into an LOE includes, but is not limited to, the light beam interacting with the LOE so as to propagate along the LOE by substantially TIR. The system 100 depicted in FIG. 1 can include various light sources 120 (e.g., LEDs, OLEDs, lasers, and masked broad-area/broad-band emitters). Light from the light source 120 may also be delivered to the LOE 190 via fiber optic cables (not shown).

Thick Media for EDGE

Figure 2:
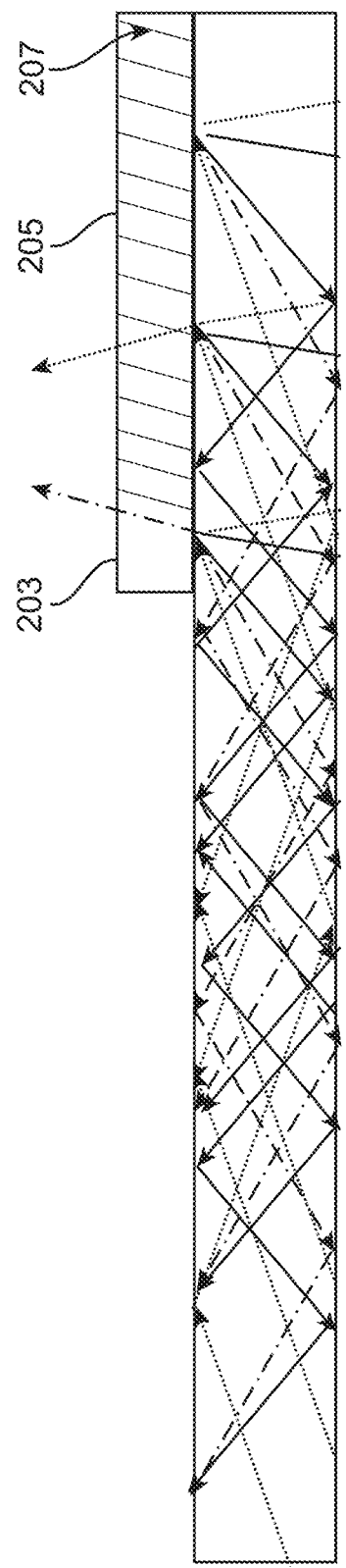
FIG. 2 shows angular multiplexing using a single thick optical element according to one embodiment.

FIG. 2 depicts angular multiplexing using a single thick light guiding optical element 190. In some embodiments, the thick optical element is between about 0.1 to about 1.5 mm thick. In other embodiments, the thick optical element is about 0.5 mm thick. The thick holographic optical element enables more precise selectivity in angle, radius of curvature and wavelength of the light guided therethrough. By controlling the direction and curvature of the light that couples into the waveguide, the system can control the direction and curvature of the individual rays that will couple out of the waveguide. The system can also produce very efficient holograms (i.e., images appearing to originate from different depth planes) with a small index of modulation. The holograms are made by modulating index of refraction of bulk material and optical gratings at a very small scale.

The thick LOEs select rays depending on various attributes (e.g., wavelength, radius of curvature, and/or in-coupling angles) allow the system to control the output of light rays though the waveguide. This allows multiplexing of multiple focal planes and wavelengths (e.g., color) through a single element due to the large dynamic range of materials. In some embodiments, the material dynamic range is 0.01 modulation so that more holograms can be multiplexed for a given diffraction efficiency multiplexing. A benefit of using a single thick holographic optical element is that only one waveguide is needed due to high selectivity of angular and wavelength, and the preservation of wave curvatures throughout the waveguide.

Both reflection (in which the diffracted light exits from the same side as the incoming rays) geometries and transmission (in which the diffracted light exits from the opposite side as the incoming rays) geometry holograms can be implemented with the waveguide. As described by Kogelnik's coupled wave theory, it is preferred to use reflection holograms to enable wavelength selectivity.

As shown in FIG. 2, only rays that correspond to a very narrow angular and radius of curvature range are out-coupled from the waveguide. The system can control the direction and curvature of the individual rays 203 that will couple out of the waveguide by controlling the range of angles of incidence, the range of wavelengths and the range of radii of curvature of the light generated by the light source. Only a few selective light rays are diffracted out, because the selectivity of the light beams is determined by the thickness of the material from which the light guiding optical element 190 is made and the optical elements made therein.

The LOE may be selective through the entire range at which light is propagating inside the waveguide. The range of radii of curvature through which the LOE is selective depends on the thickness of the polymer layer 205 in which gratings are formed. For instance, for a thick LOE with a 1 mm thick polymer layer, the LOE range of radii of curvatures may be about 1 m. The LOE's wavelength selectivity depends upon whether the LOE is used in transmission or reflection mode, and the curvature of the holograms. In reflection mode, the wavelength selectivity may be as small as a few nanometers. The sensitivity of the LOE for differences in angles of incidence, radii of curvature and wavelengths depend upon the geometry of the LOE and may be mutually dependent.

As mentioned above, individual exit ray 203 location and direction can be controlled since the waveguide conserves both angle and wavefront curvature, which allows selective control of individual exit ray location and direction by controlling the input light. Therefore, multiple viewing plane pupils can be multiplexed at multiple grating locations, allowing for pupil expansion.

The system can also change depth planes by controlling the curvature of light of spherical rays (i.e., radius of curvature) that are diffracted by the hologram. In prior art systems, plane waves (i.e., of collimated light) do not have any curvature. However, this system allows matching of curvature of a specific wavefront to a specific ray of light going into a different direction.

Gratings 207 can be written in the polymer layer 205 based on interfering light beams that create an interference pattern. The gratings 207 can diffract various light beams to multiple places, one place, or nowhere at all, depending on various characteristics of the input light beams. Each grating 207 diffracts one set of beams from a predetermined input direction to another predetermined selective output direction. As such, only narrow beams will be diffracted by the gratings 207 in the polymer layer 205. The light interacting with the volume within an entire depth of polymer material allows the light beam components to add up constructively. The polymer material may have a thickness of about 0.1 mm to about 1.5 mm. This allows only one order of beam to in-couple and one order of beam to out-couple. Additionally, the system can use the superposition of LOE and polymer layer 205 in which the gratings 207 are formed to expand the viewing angle of the transmitted or reflected ray outside of the hologram based on the input of the light ray.

Multiplexing allows the system to use a single eyepiece to generate images at various depth planes, which changes the apparent depth of virtual objects. In some embodiments, the system will contain a Variable Focus Element (VFE) that can adjust wavefront curvature of the light in-coupling to the waveguide. The VFE is configurable to vary a focus (i.e., wavefront curvature) of the projected light and transmit the light to the user's eyes. Also as mentioned above, the input gratings can be programmed so only rays of a particular angle and wavelength are in-coupled. Angular multiplexing can also compensate for distortion of input objective lenses.

Figure 3:
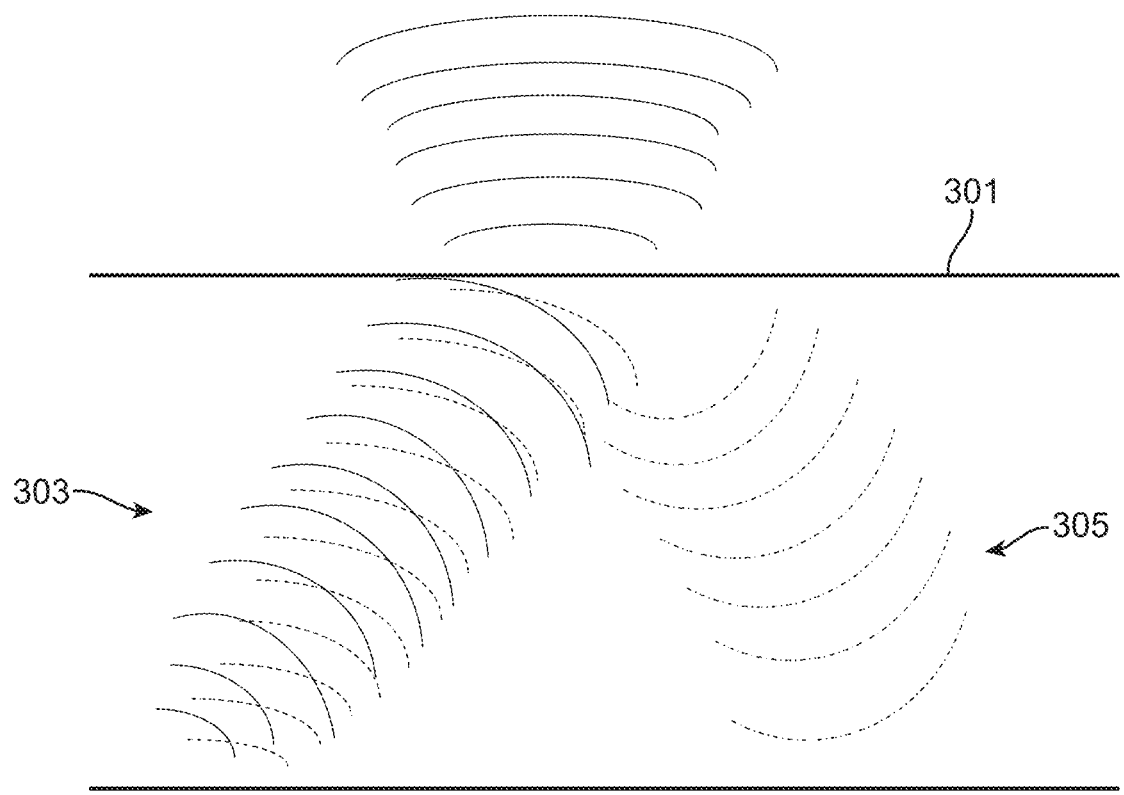
FIG. 3 shows curvature multiplexing using a single thick optical element according to one embodiment.

FIG. 3 depicts a curvature multiplexing using a single thick optical element 301. The volume holograms are thick enough to preserve the wavefront curvature of light in-coupling to the waveguide 301. In some embodiments, the system can control the curvature of the individual rays 303 that will couple out of the waveguide 301 by controlling the range of angle of incidence, range of wavelength and range of radius of curvature of the light generated by the light source based on the pattern of the grating. In some embodiments, the individual rays 305 will not couple out of the waveguide 301 because of the selected angle of the grating. Only a few selective curvature light rays (e.g., 303) are out coupled based on the e.g., selectivity of the angle of the light beams.

In some embodiments, the system will multiplex multiple depth planes in a single eye piece/waveguide. However, the system cannot just use existing waveguides and gratings because they will only accept straight waves (i.e., collimated light beams) which will be diffracted in parallel. This will create no depth using a single waveguide. On the other hand, the disclosed system matches output wavefront curvatures to input wavefront curvatures. The hologram can be configured to diffract a piece of light only if it has the predetermined direction, angle, and curvature coming into the eye piece.

As mentioned above, individual exit ray 303 location and curvature can be controlled since the waveguide is selective in both angle and wavefront curvature, which allows selective control of individual exit ray location and curvature by controlling the range of angle of incidence of the input light ray and the radius of curvature of the input light ray. Therefore, curvatures can be preserved multiplexed at multiple grating locations.

Figure 4:
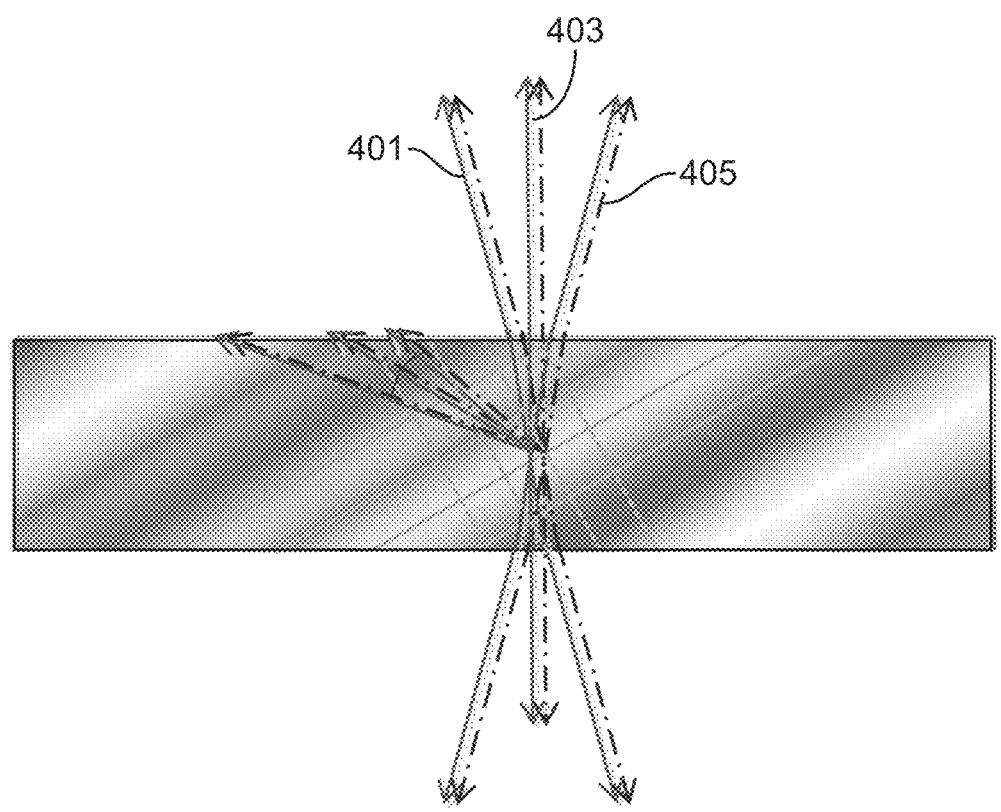
FIG. 4 shows spectral multiplexing using a single thick optical element according to one embodiment.

FIG. 4 depicts a spectral multiplexing using a single thick optical element. The volume hologram is especially spectrally sensitive. In some embodiments, this allows R 401, G 403, and B 405 color components to be multiplexed in a single layer waveguide. In other embodiments, dispersion compensation could allow the use of wider bandwidth light sources such as superluminescent diode ("SLED or SLD")'s or chaotic lasers to reduce speckle.

Pupil Expanders

Figure 6:
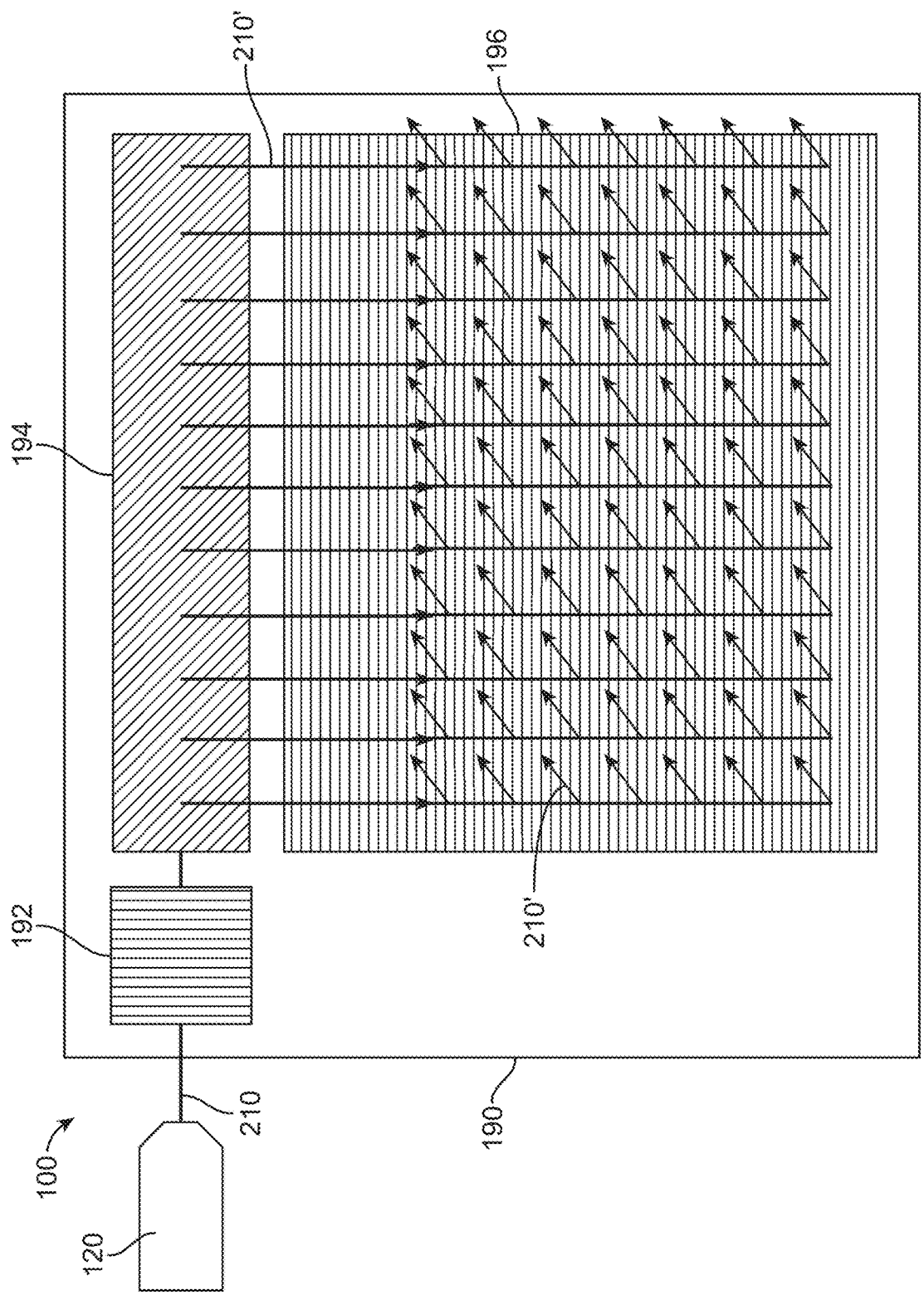
FIG. 6 is a detailed schematic of a light guiding optical element of an optical system according to one embodiment.

As shown in FIG. 6, portions of the LOEs 190 described above can function as exit pupil expanders 196 ("EPE") to increase the numerical aperture of a light source 120 in the Y direction, thereby increasing the resolution of the system 100. Since the light source 120 produces light of a small diameter/spot size, the EPE 196 expands the apparent size of the pupil of light exiting from the LOE 190 to increase the system resolution. The VR/AR/MR system 100 may further comprise an orthogonal pupil expander 194 ("OPE") in addition to an EPE 196 to expand the light in both the X (OPE) and Y (EPE) directions. More details about the EPEs 196 and OPEs 194 are described in the above-referenced U.S. Utility patent application Ser. No. 14/555,585 and U.S. Utility patent application Ser. No. 14/726,424, the contents of which have been previously incorporated by reference.

Figure 7:
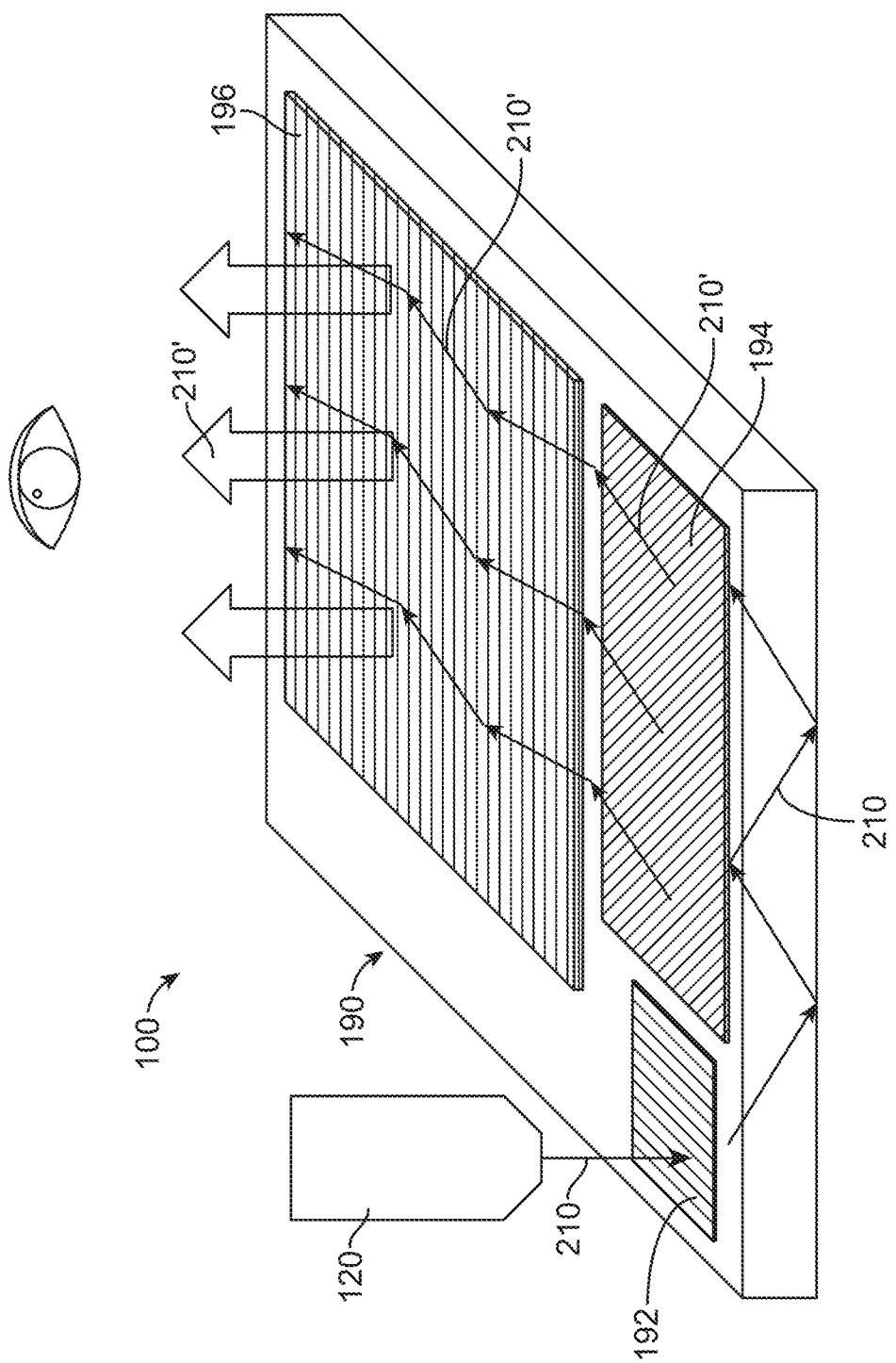
FIG. 7 is a detailed perspective view of a light guiding optical element of an optical system according to one embodiment.

FIG. 7 depicts another optical system 100 including an LOE 190 having an ICG 192, an OPE 194, and an EPE 196. The system 100 also includes a light source 120 configured to direct a virtual light beam 210 into the LOE 190 via the ICG 192. The light beam 210 is divided into beam lets 210' by the OPE 194 and the EPE 196 as described with respect to FIG. 6 above. Further, as the beam lets 210' propagate through the EPE 196, they also exit the LOE 190 via the EPE 196 toward the user's eye. Only select beams 210 and beam lets 210' are labeled for clarity.

The above-described VR/AR/MR systems are provided as examples of various optical systems that can benefit from more selectively reflective optical elements. Accordingly, use of the optical systems described herein is not limited to the disclosed VR/AR/MR systems, but rather applicable to any optical system.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allows for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A head worn imaging system, comprising:
   a light source configured to generate a light beam;
   a light guiding optical element having a thickness of between 0.1 and 1.5 mm and comprising an entry portion and an exit portion; and
   a variable focus element configured to adjust a curvature of the light beam by adjusting a focus before the light beam enters the light guiding optical element through the entry portion,
   wherein the light guiding optical element is configured to propagate at least a portion of the light beam by total internal reflection, and
   wherein the exit portion of the light guiding optical element is configured to selectively allow light addressing the exit portion to exit the light guiding optical element based on a wavelength of the light beam.

2. The system of claim 1, wherein the light guiding optical element allows multiplexing of light having a plurality of wavelengths through the light guiding optical element.

3. The system of claim 1, wherein the exit portion comprises an out-coupling grating corresponding to a particular depth plane.

4. The system of claim 1, wherein a portion of light beam is selected to exit the light guiding optical element based at least on a thickness of the light guiding optical element or the out-coupling grating.

5. The system of claim 1, wherein a portion of light beam is selected to exit the light guiding optical element based at least on a pattern of the out-coupling grating.

6. The system of claim 1, wherein a portion of light beam is selected to enter the light guiding optical element based at least on an in-coupling grating.

7. The system of claim 1, wherein the light guiding optical element comprises a reflection hologram.

8. The system of claim 1, wherein the light guiding optical element comprises a transmission hologram.

9. The system of claim 1, wherein the light guiding optical element can be operated in a reflection mode or a transmission mode.

10. The system of claim 9, wherein a wavelength selectivity of the light guiding optical element depends on whether the light guiding optical element is operated in the reflection mode or the transmission mode.

11. The system of claim 9, wherein the light guiding optical element has a wavelength selectivity in a nanometer range when the light guiding optical element is operated in the reflection mode.

12. A head worn imaging system, comprising:
    a light source configured to generate a light beam;
    a light guiding optical element having a thickness of between 0.1 and 1.5 mm and comprising an entry portion and an exit portion,
    wherein the light guiding optical element is configured to propagate at least a portion of the light beam by total internal reflection,
    wherein the exit portion of the light guiding optical element is configured to selectively allow light addressing the exit portion to exit the light guiding optical element based on a wavelength of the light beam, and
    wherein the light guiding optical element is configured to preserve a curvature of the light beam through the wavelength.

* * * * *